(12) United States Patent
Liu

(10) Patent No.: US 8,042,457 B2
(45) Date of Patent: Oct. 25, 2011

(54) GRILL WITH ANTI-SCALD STRUCTURE

(75) Inventor: Tachi Liu, Banciao (TW)

(73) Assignee: Tsann Kuen (China) Enterprise Co., Ltd., Xiamen, Fujian (CN)

( * ) Notice: Subject to any disclaimer, the term of this patent is extended or adjusted under 35 U.S.C. 154(b) by 841 days.

(21) Appl. No.: 12/105,256

(22) Filed: Apr. 17, 2008

(65) Prior Publication Data

US 2009/0020022 A1   Jan. 22, 2009

(30) Foreign Application Priority Data

Apr. 17, 2007 (CN) .................. 2007 2 0006833 U

(51) Int. Cl.
*A47J 31/06* (2006.01)
*H05B 3/06* (2006.01)

(52) U.S. Cl. .......................................... 99/372; 99/378

(58) Field of Classification Search .............. 99/372, 99/374, 375, 376, 377, 378, 379, 380
See application file for complete search history.

(56) References Cited

U.S. PATENT DOCUMENTS

| | | | |
|---|---|---|---|
| 3,978,238 A * | 8/1976 | Frey et al. ..................... | 426/523 |
| 6,130,416 A * | 10/2000 | Gabbai ........................ | 219/524 |
| 6,429,409 B1 * | 8/2002 | Siu .............................. | 219/450.1 |
| 2004/0182252 A1 * | 9/2004 | Brady et al. ..................... | 99/372 |

FOREIGN PATENT DOCUMENTS

| | | |
|---|---|---|
| DE | 4031218 C1 | 4/1992 |
| GB | 240153 A | 11/2004 |

OTHER PUBLICATIONS

Robert Price Application No. GB0807026 Search Report under Section 17 Date of search: Jun. 26, 2008 p. 1 UK IPO.

* cited by examiner

*Primary Examiner* — Reginald L Alexander
(74) *Attorney, Agent, or Firm* — Kening Li; Pinsent Masons LLP

(57) ABSTRACT

A grill with anti-scald structure is disclosed. The grill has a lower base, an upper bakelite shell and a lower grill pan embedded in the upside of the lower base, an upper grill pan embedded in the underside of the upper bakelite shell, both upper grill pan and lower grill pan having heating devices, and the upper grill pan and the lower grill pan form a reversible connection between them. The upper bakelite shell is covered by an anti-scald decorative panel on the top, and the anti-scald decorative panel and the upper bakelite shell form a heat insulation interstice between them. The heat insulation interstice between the upper bakelite shell and anti-scald decorative panel can insulate the heat effectively, thus the surface temperature of the anti-scald decorative panel is close to normal temperature to avoid the scald, and the anti-scald decorative panel can decorate the grill.

3 Claims, 3 Drawing Sheets

GRILL WITH ANTI-SCALD STRUCTURE

FIELD OF THE INVENTION

The present invention relates to cooking utensils, and more particularly to a grill with anti-scald structure.

RELATED ART

Cooking utensils such as grills, waffle makers and hamburger makers etc. are commonly used in Western families. Of late, these cooking utensils are gradually starting to be used by families in China as well.

The grill, waffle maker or hamburger maker commonly has an upper grill pan and a lower grill pan, the lower grill pan embedded in the upside of a lower base, the upper grill pan embedded in the underside of an upper shell, a reversible connection formed between the upper grill pan and the lower grill pan, and the main body of the upper shell and the lower base are typically made of bakelite. When in use, the grill pan will reach a high temperature, and the upper bakelite shell will also reach a high temperature due to the heat from the grill pan, creating a high scalding risk to the users.

Moreover, there is no positioning device between the upper bakelite shell and the lower base. During grilling, if the grill is hit or shaken, the food items rested between the upper pan and lower grill pan would easily drop out, which not only causes the food to be lost, but also may also cause injury. In addition, the tack of the positioning device between the upper bakelite shell and the lower base make the grill inconvenient to carry around.

SUMMARY OF THE INVENTION

The present invention provides a grill with anti-scald structure, the primary object of the present invention is to obviate the disadvantages of the bakelite shell of conventional grill being easy to scald the users; another object of the present invention is to obviate the disadvantages of the inconvenience of grilling and carrying of the conventional grill whose the upper bakelite shell and the lower base tend to auto-separate in use.

The above and other objects of the invention are achieved by providing a grill with anti-scald structure, wherein the grill has a lower bases an upper bakelite shell and a lower grill pan embedded in the upside of the lower bases a upper grill pan embedded in the underside of the shell, both the upper grill pan and lower grill pan having heating devices, and the upper grill pan and the lower grill pan form a reversible connection between them. The upper bakelite shell is covered by an anti-scald and decorative panel on the top, and the anti-scald and decorative panel and the upper bakelite shell forms a heat insulation interstice between them.

Aforementioned grill with anti-scald structure, wherein the edge of the upper bakelite shell is extending upward to form a chimb, the near-edge portion of the underside of the anti-scald and decorative panel touching the top of the chimb, and the space between the underside of anti-scald and decorative panel, the upside of the upper bakelite shell and the chimb form the heat insulation interstice; the anti-scald and decorative panel forms an extending downward positioning column, the upper bakelite shell having fitting holes in corresponding position, and there are screws, being through the fitting hole form the bottom up, fixed on the lower terminal of the positioning column, thus the anti-scald and decorative panel is fixed on the upper bakelite shell.

Aforementioned grill with anti-scald structure, wherein the outer edge of the lower base and the outer edge of the upper bakelite shell are connected by couplers, the bottom terminal of the coupler pivotally connected to the outer edge of the lower base by a hinge, the top terminal of the coupler forms a hook extending to inner side, and a hole cooperating with the hook is set in the corresponding position of the upper bakelite shell.

Furthermore, there are two said couplers and two corresponding holes respectively, both sides have ones.

By above-mentioned description of the invention, compared with the prior arts, the present invention has advantages as follows: firstly, the heat insulation interstice between the upper bakelite shell and the anti-scald and decorative panel can insulate the heat effectively, thus the surface temperature of the anti-scald and decorative panel approaches to normal temperature to avoid the scald, and the anti-scald and decorative panel can decorate the grill; secondly, the upper bakelite shell and the lower base are connected with each other by couplers, which enhance the safety in grilling and make it easy to carry the grill.

DETAILED DESCRIPTION OF THE PREFERRED EMBODIMENT

The preferred embodiments of the invention can be better understood with reference to FIG. 1 to FIG. 4.

Figure 1:
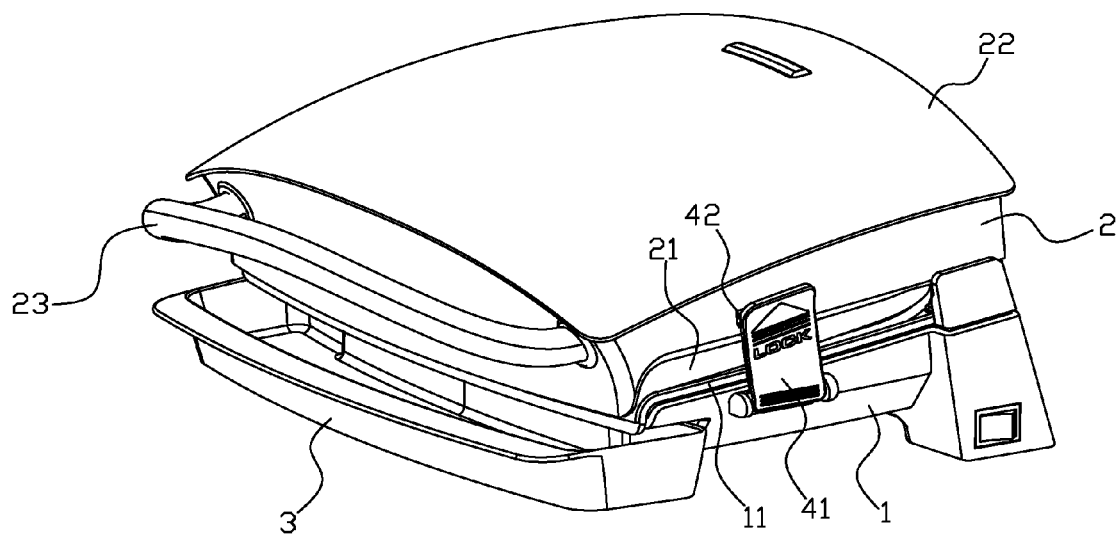
FIG. 1 is perspective view of the grill appearance of the present invention.

Referring to FIG. 1, the grill includes a base 1, an upper bakelite shell 2 and a lower grill pan 11 embedded in the upside of the lower base 1, an upper grill pan 21 embedded in the underside of the upper bakelite shell 2. Both the upper grill pan 21 and lower grill pan 11 have heating devices, and the upper grill pan 21 and the lower grill pan 11 are connected by a reversible connection. These structures are well known and they are not the innovation of the invention, so the details do not be described here.

Figure 2:
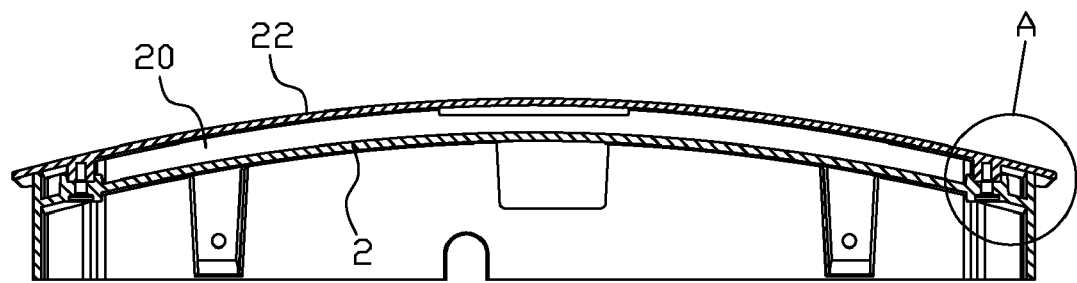
FIG. 2 is a sectional view of the upper bakelite shell and anti-scald and decorative panel of the present invention.
Figure 3:
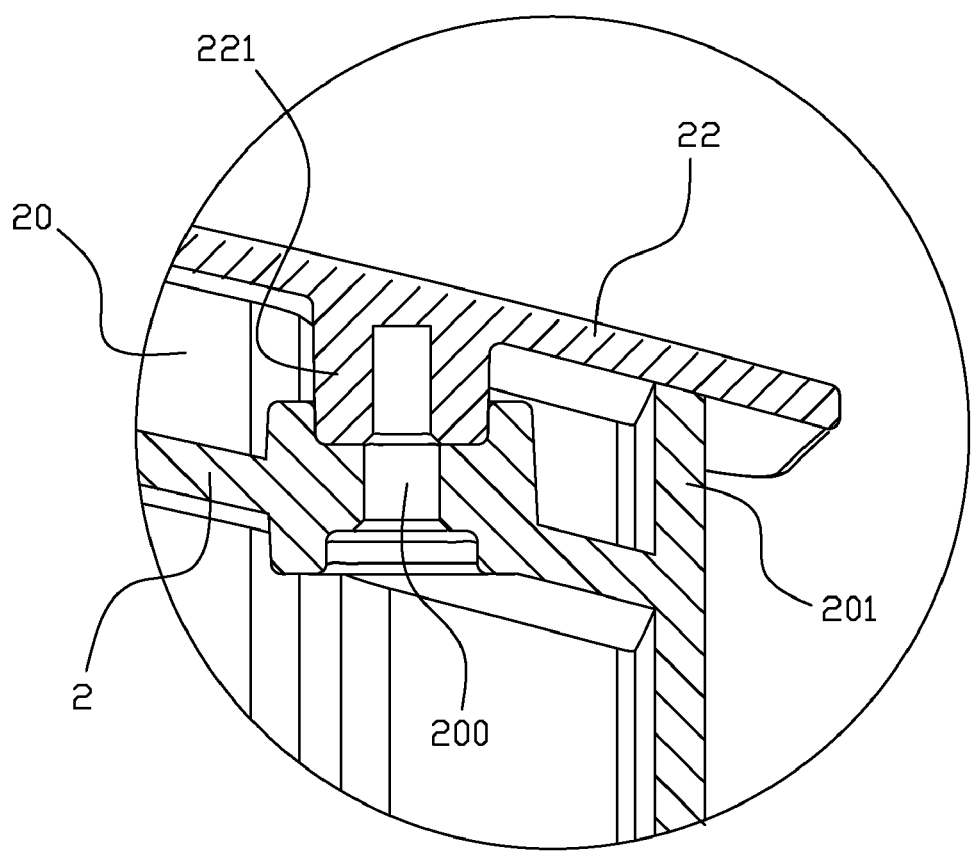
FIG. 3 is a partial enlargement view of the A portion of FIG. 1

Referring to FIG. 2, the upper bakelite shell 2 covered by an anti-scald and decorative panel 22, the anti-scald and decorative panel 22 and the upper bakelite shell 2 forms a heat insulation interstice 20 between them. Referring to FIG. 3, the edge of the upper bakelite shell 2 is extending upward so as to form a chimb 201, and the near-edge portion of the underside of the anti-scald and decorative panel 22 touches the top of the chimb 201. The space between the underside of the anti-scald and decorative panel 22, the upside of upper the bakelite shell 2 and chimb 201 forms the heat insulation interstice 20. The underside of the anti-scald and decorative panel 22 forms an extending downward positioning column 221, the upper bakelite shell 2 having fitting holes 200 in corresponding position to the positioning column 221, and there are screws fixed on the lower terminal of the positioning column 221 through the fitting hole 200 from the bottom up, thus the anti-scald and decorative panel 22 are fixed on the upper bakelite shell 2. The screws are not shown in the Figures.

The heat insulation interstice 20 between the upper bakelite shell 2 and the anti-scald and decorative panel 22 can insulate the heat effectively, thus the surface temperature of the anti-scald and decorative panel 22 approaches to normal temperature to avoid the scald, and the anti-scald and decorative panel 22 can decorate the grill.

Figure 4:
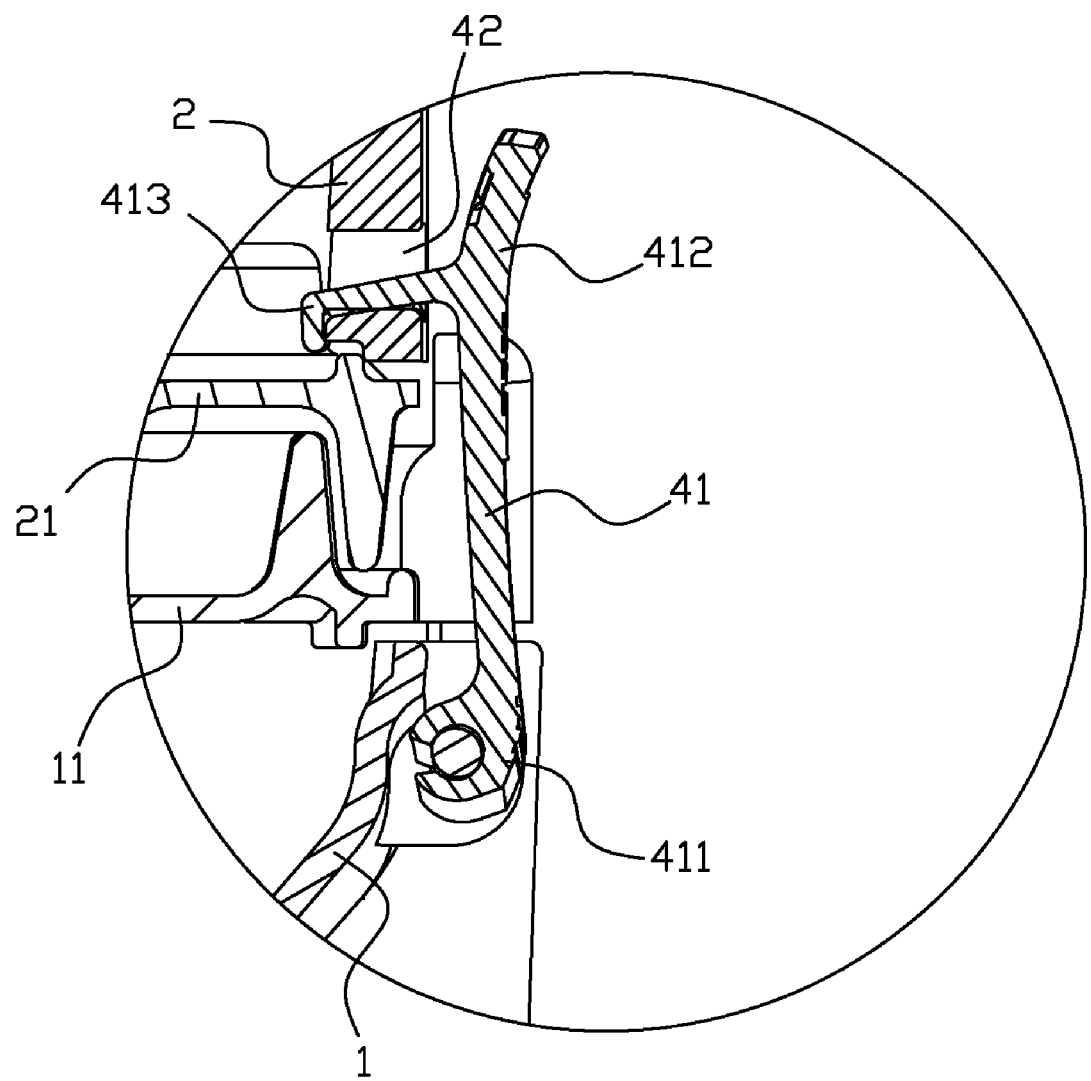
FIG. 4 is a sectional view of the portion of coupler of the present invention.

Referring to FIG. 1 and FIG. 4, the outer edge of the lower base 1 connects with the outer edge of the upper bakelite shell 2 by a coupler 41, the bottom terminal 411 of the coupler 41 pivotally connected to the outer edge of the lower base by a hinge, the top terminal 412 of the coupler 41 forming a hook 413, which extends to the inner side, and a hole 42 couple with the hooks 413 is set in the corresponding position of the upper bakelite shell 2. There are two couplers 41 and two corresponding holes 42 respectively on both sides of the lower base 1 and the upper bakelite shell 2. The upper bakelite shell 2 and the lower base 1 can be positioned to each other by the cooperation of the couplers 41 and the holes 42, which enhance the safety in grilling and make it easy to carry the grill.

The above-mentioned descriptions are of exemplary embodiments only, and are not intended to limit the scope, applicability or configuration of the invention in any way. All changes that come within the meaning and range of equivalency of the claims are to be embraced within their scope.

What is claimed is:

1. A grill with an anti-scalding structure, comprising:
   a lower base;
   an upper bakelite shell;
   a lower grill pan embedded in an upside of said lower base;
   an upper grill pan embedded in an underside of said upper bakelite shell; both said upper grill pan and said lower grill pan having at least one heating device, and a reversible connection formed between said upper grill pan and said lower grill pan, wherein said upper bakelite shell is covered by an anti-scald panel on the top, and said anti-scald panel and said upper bakelite shell form a heat insulation interstice between them;
   wherein an edge of said upper bakelite shell is extending upward to form a flange, a near-edge portion of an underside of said anti-scald panel disposed on a top of said flange, and said heat insulation interstice is formed between said underside of said anti-scald panel, an upside of said upper bakelite shell and said flange.

2. The grill with anti-scald structure according to claim 1, wherein said anti-scald panel forms an extending downward positioning column, said upper bakelite shell having fitting holes in corresponding position to said extending downward positioning column, and there are screws fixed on a lower terminal of said extending downward positioning column through said fitting holes, thus said anti-scald panel is fixed on said upper bakelite shell.

3. A grill with an anti-scalding structure, comprising:
   a lower base;
   an upper bakelite shell;
   a lower grill pan embedded in an upside of said lower base;
   an upper grill pan embedded in an underside of said upper bakelite shell; both said upper grill pan and said lower grill pan having at least one heating device, and a reversible connection formed between said upper grill pan and said lower grill pan, wherein said upper bakelite shell is covered by an anti-scald panel on the top, and said anti-scald panel and said upper bakelite shell form a heat insulation interstice between them;
   wherein an outer edge of said lower base and an outer edge of said upper bakelite shell are connected by a coupler;
   wherein a bottom terminal of said coupler is pivotally connected to said outer edge of said lower base, a top terminal of said coupler forming a hook, and a hole couple with said hook is set in the corresponding position of said upper bakelite shell;
   wherein there are two said couplers and two said holes corresponding to said couplers respectively on both sides of said lower base and said upper bakelite shell.

* * * * *